June 3, 1924.
S. L. LAUGHLIN
LUBRICATOR FOR SHAFTS
Filed Nov. 7, 1921
1,496,236
2 Sheets-Sheet 1
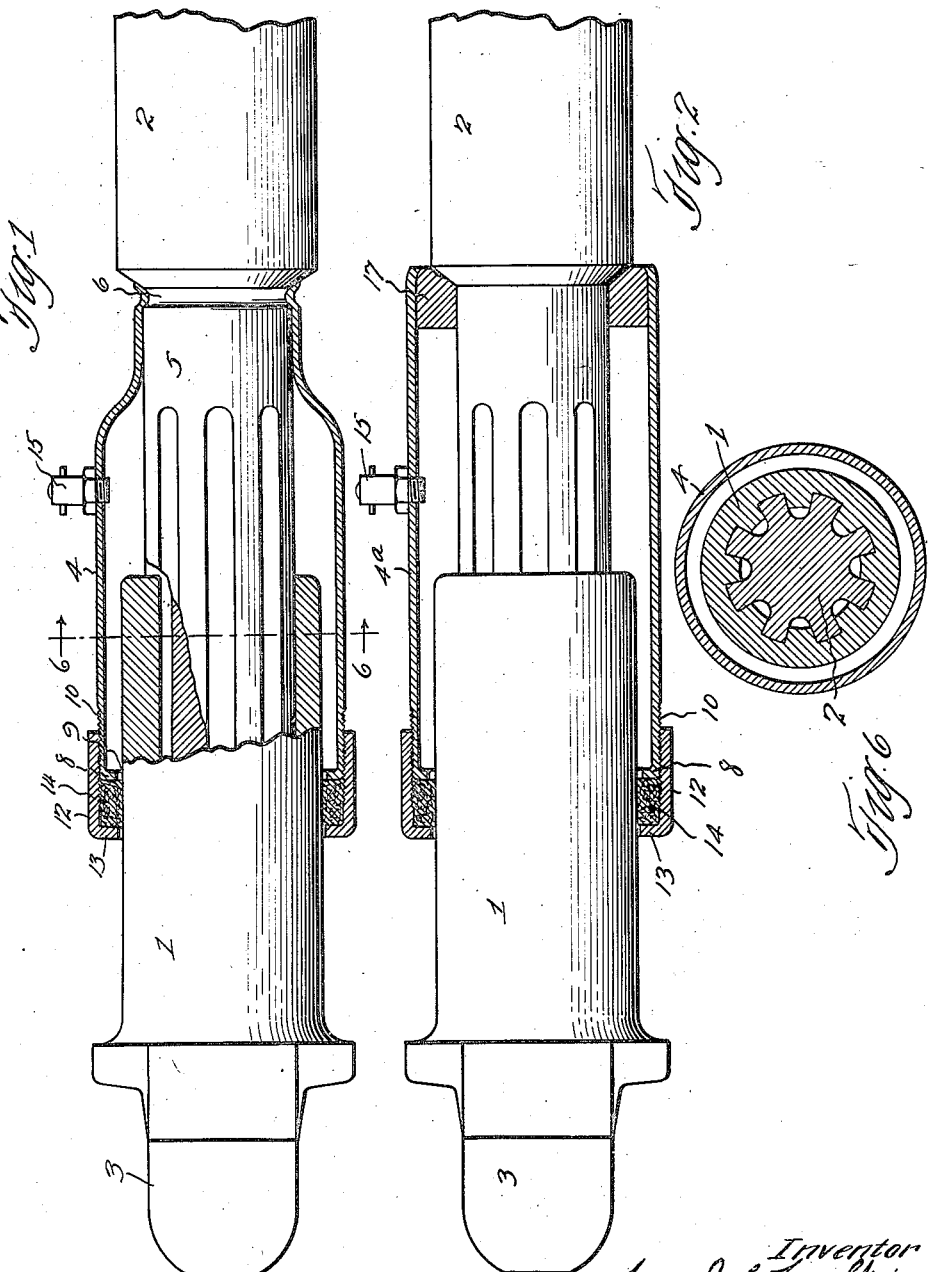

June 3, 1924.
S. L. LAUGHLIN
LUBRICATOR FOR SHAFTS
Filed Nov. 7, 1921
1,496,236
2 Sheets-Sheet 2
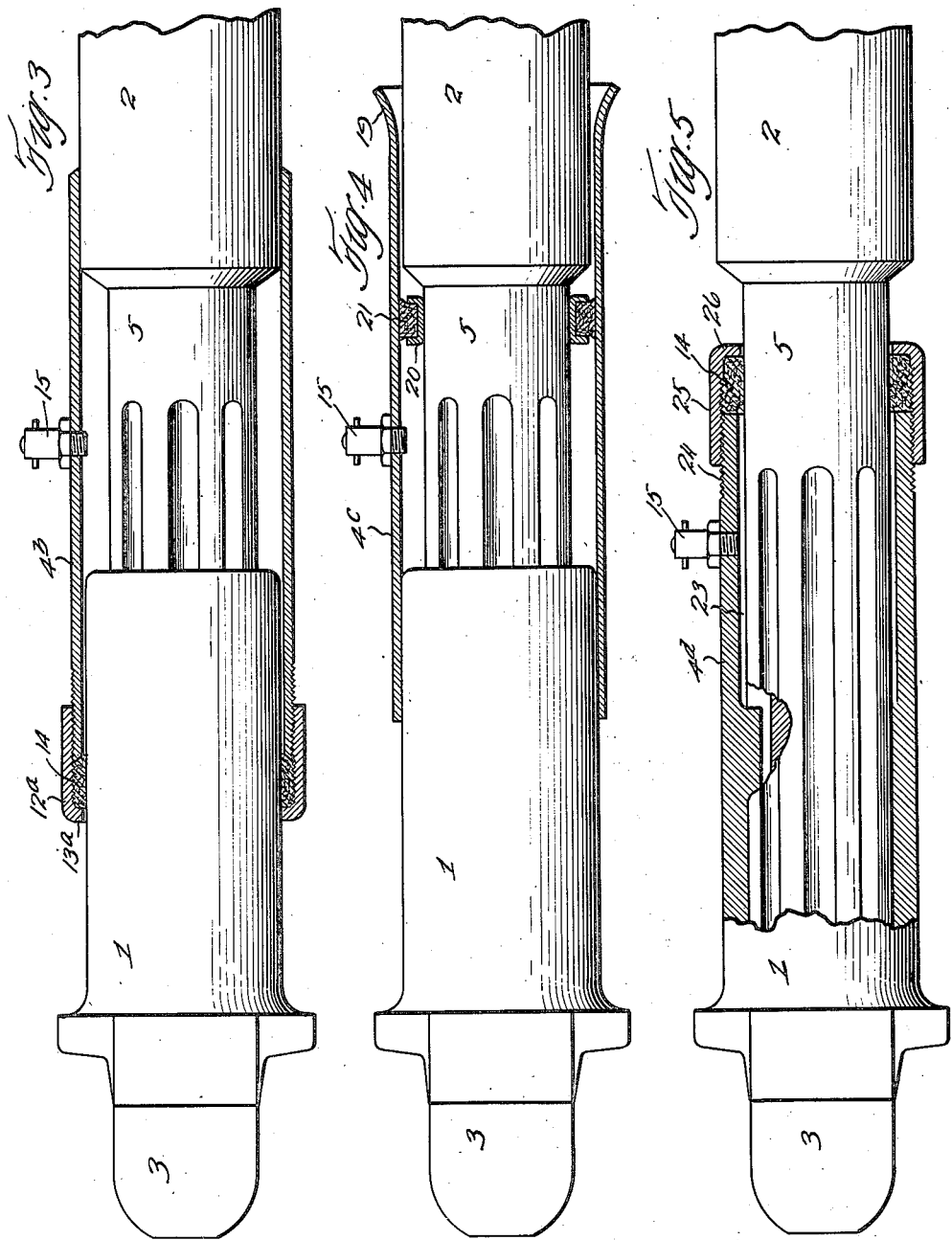

Patented June 3, 1924.

1,496,236

UNITED STATES PATENT OFFICE.

SAMUEL L. LAUGHLIN, OF CLEVELAND, OHIO, ASSIGNOR TO THE CLEVELAND UNIVERSAL PARTS COMPANY, OF CLEVELAND, OHIO, A CORPORATION OF OHIO.

LUBRICATOR FOR SHAFTS.

Application filed November 7, 1921. Serial No. 513,320.

*To all whom it may concern:*

Be it known that I, SAMUEL L. LAUGHLIN, a citizen of the United States, residing at Cleveland, in the county of Cuyahoga and State of Ohio, have invented a certain new and useful Improvement in Lubricators for Shafts, of which the following is a full, clear, and exact description, reference being had to the accompanying drawings.

This invention relates to lubricators for shafts and has particular reference to lubricators for shafts which are mounted for longitudinal movement, one with respect to the other.

Some of the objects of the present invention are to provide a lubricator for shafts which are mounted for longitudinal movement, one with respect to the other as the splined connection between the propeller shaft and universal joint of an automobile; to provide a lubricator of this type which shall effectively lubricate the moving surfaces of such joint and hence minimize the wear therebetween and prevent undue noises; to provide a lubricator which shall permit free longitudinal movement between the shafts and which shall prevent loss of lubricant therefrom; to provide a lubricator which shall consist of few parts which are simple in construction and inexpensive to manufacture, while further objects and advantages will appear as the description proceeds.

In the accompanying drawings wherein I have shown certain illustrative embodiments of my invention but without intent to limit myself thereto, Fig. 1 is a vertical sectional view through a joint equipped with one form of my lubricator: Figs. 2–5 inclusive are similar views each illustrating a modification, and Fig. 6 is a transverse sectional view taken on the line 6—6 of Fig. 1.

Describing the various parts by reference characters, 1 and 2 indicate two shafts which are splined for longitudinal movement one with respect to the other. In the present instance I have shown the shaft 1 as forming a part of a universal joint (not shown) which may be connected with the trunnions 3 in the usual manner.

Referring to Fig. 1 it will be seen that I enclose the splined connection between shafts 1 and 2, in a housing 4 which is preferably formed from sheet metal. This housing is reduced in diameter at one end and is fitted snugly over the reduced portion 5 of shaft 2, where it is secured in any suitable manner and by rolling a portion of said housing into a groove 6 formed in said shaft. The opposite end of the housing is turned inwardly to form a shoulder 8 which defines a central opening 9 through which shaft 1 projects loosely. The outer surface of the end of the housing is threaded as indicated at 10 to receive a gland nut 12 which is formed with an inwardly turned shoulder 13. Suitable packing material 14 is interposed between shoulders 8 and 13, and gland nut 12 is screwed up tight on the threaded portion of the housing to force said packing into contact with shaft 1. Lubricant may be introduced into the housing through a suitable inlet indicated at 15 and will penetrate between the splined portion of the shafts. Longitudinal movement of one shaft with respect to the other will cause packing 14 to wipe the outer surface of shaft 1 and such longitudinal movement will also serve to force the lubricant between the splined connection.

In Fig. 2 I have shown the housing 4ª of the same diameter throughout. In this instance the housing is fastened to a suitable ring 17 which is pressed on the reduced end of shaft 2. The remaining parts of the lubricator are similar to that described in connection with Fig. 1.

In Fig. 3 the housing 4ᵇ is formed with an internal diameter substantially equal to the diameter of shaft 2 and said housing is fastened to the shaft by forcing it thereover. If shaft 1 is of substantially the same diameter as shaft 2, as shown in the present illustration, then the packing material 14 is positioned directly against the circumferential edge of the housing and a gland nut 12ª having an inwardly directed shoulder 13ª is applied as before.

In Fig. 4 I have shown the housing 4ᶜ fitted snugly on shaft 1 and extending over shaft 2 where it is flared outwardly as indicated at 19. A ring 20 having a substantially U-shaped cross section is pressed on the reduced portion 5 of shaft 2 and suitable packing 21 is positioned in the channel portion of said ring and contacts with the inner surface of the housing to prevent lubricant escaping therefrom.

In Fig. 5 I have shown a still further modification in which shaft 1 is provided with an integral formed housing 4ᵈ. This housing is formed by counter boring the end of shaft 1 to provide a lubricant space or well 23 about the splined end of shaft 2. The end of shaft 1 is externally threaded as indicated at 24 to receive a packing gland nut 25 having an inwardly directed shoulder 26 which confines the packing material 14 about the reduced portion of shaft 2.

Lubricant is introduced through the inlet 15 into the housing and the longitudinal movement of one shaft with respect to the other will serve to distribute the grease between the moving surfaces continually. That is when the reduced portion 5 of shaft 2 moves toward shaft 1, then the housing will force the lubricant through the splined connection, under pressure, into the well defined by the bore of shaft 1 and the end of reduced portion 5. As the shafts separate, a suction will be created in said well which will draw a portion of the grease back into the housing again thus serving to continually force lubricant between the moving surfaces.

Having thus described my invention, what I claim is:

1. The combination with a shaft, having one end thereof reduced in diameter, of a second shaft splined on said reduced portion, a sheet metal housing secured to said first mentioned shaft and extending over said second shaft, the metal of said housing being deflected over to form a shoulder adjacent said second shaft, packing material disposed about said second shaft and contacting with said shoulder, a gland nut enclosing said packing material and secured to said housing, and means for introducing lubricant into said housing.

2. The combination with a driving shaft, of a driven shaft having a reduced end splined within said driving shaft, a sheet metal housing having one end thereof fastened to the reduced end of said driven shaft and extending over and enclosing the spline connection between said shafts, the end of said housing extending over said driving shaft being turned inwardly to define a shoulder, packing material disposed about said driving shaft and contacting with said shoulder, a gland nut enclosing said packing material and fastened to said housing, said packing material being adapted to wipe the driving shaft upon longitudinal movement of one of said shafts with respect to the other, and means for introducing lubricant into said housing.

In testimony whereof, I hereunto affix my signature.

SAMUEL L. LAUGHLIN.